United States Patent
Yamamoto et al.

(10) Patent No.: US 11,210,065 B2
(45) Date of Patent: Dec. 28, 2021

(54) ANALYSIS CONDITION DATA CONVERSION DEVICE, DATA PROCESSING SYSTEM AND ANALYSIS SYSTEM

(71) Applicant: SHIMADZU CORPORATION, Kyoto (JP)

(72) Inventors: Akane Yamamoto, Kyoto (JP); Yoshiki Tainaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 750 days.

(21) Appl. No.: 16/136,338

(22) Filed: Sep. 20, 2018

(65) Prior Publication Data

US 2019/0087158 A1 Mar. 21, 2019

(30) Foreign Application Priority Data

Sep. 21, 2017 (JP) .............................. JP2017-180770

(51) Int. Cl.

| G06F 7/523 | (2006.01) |
| H01J 49/00 | (2006.01) |
| G05B 15/00 | (2006.01) |
| H01J 49/26 | (2006.01) |
| G01N 30/72 | (2006.01) |

(52) U.S. Cl.
CPC .............. *G06F 7/523* (2013.01); *G05B 15/00* (2013.01); *H01J 49/0009* (2013.01); *H01J 49/0027* (2013.01); *H01J 49/0036* (2013.01); *H01J 49/26* (2013.01); *G01N 30/72* (2013.01)

(58) Field of Classification Search
CPC ...... G06F 7/523; G05B 15/00; H01J 49/0027; H01J 49/0009; H01J 49/26; H01J 49/0036; G01N 30/72

USPC ................................................ 702/22–28, 31
See application file for complete search history.

(56) References Cited

FOREIGN PATENT DOCUMENTS

| JP | 2011-146000 A |   | 7/2011 |
| JP | 2011146000 A | * | 7/2011 |
| JP | 2016-045768 A |   | 4/2016 |

OTHER PUBLICATIONS

"A Rapid iMethod Application for Screening Pesticides V.2.2 for Cliquid Software", AB SCIEX, 2012, pp. 1-9.
"Shimadzu Pesticide MRM Library Support for LC/MS/MS [LCMS-8050, LCMS-8060]", Shimadzu Excellent in Science, Application News No. C135, 24 pages.

* cited by examiner

*Primary Examiner* — Michael Maskell
(74) *Attorney, Agent, or Firm* — Sughrue Mion, PLLC

(57) ABSTRACT

An item setter sets a plurality of first analysis parameters included in first analysis condition data acquired by an analysis condition data acquirer in a first item that is dependent on characteristics of a first analysis device and a second analysis device, and a second item that is not dependent on the characteristics of the first and second analysis devices. A parameter value converter converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter as it is.

12 Claims, 8 Drawing Sheets

FIG. 3

|  | ANALYSIS PARAMETER | FIRST MASS SPECTROMETRY DEVICE | SECOND MASS SPECTROMETRY DEVICE |
|---|---|---|---|
| DEVICE NON-DEPENDENT PARAMETER | PRECURSOR ION m/z | Q1 mass | Precursor m/z |
|  | PRODUCT ION m/z | Q3 mass | Product m/z |
|  | RETENTION TIME | Time | Ret.Time |
|  | COMPOUND NAME | ID | Compound Name |
| DEVICE DEPENDENT PARAMETER | COLLISION ENERGY | CE | CE |
| DEFAULT VALUE PARAMETER | Q1 PRE BIAS VOLTAGE | Prefilter | Q1 Pre Bias |
|  | Q3 PRE BIAS VOLTAGE | Collision Cell Exit Potential | Q3 Pre Bias |
|  | DWELL TIME | Dwell Time | Dwell Time |

FIRST SETTING SCREEN (410)

Compound Name: Compound A (415)

| Ch | Precursor m/z | Product m/z | Dwell Time (msec) | CE | TB1 |
|---|---|---|---|---|---|
| 1 | 250.00 | 130.00 | 100.00 | -35.0 | |
| 2 | | | | | |
| 3 | | | | | |

411　412　413　414

SECOND SETTING SCREEN (420) TB2

| ID# | Name | Type | m/z | Ret.Time |
|---|---|---|---|---|
| 1 | Compound A | Target | 250.00>130.00 | 5.60000 |
| 2 | Compound B | Target | 450.00>160.00 | 4.30000 |
| 3 | Compound C | Target | 500.00>380.00 | 3.50000 |
| 4 | | | | |

421　422　423　424

EXTENDED SETTING SCREEN (430)

Compound Name: Compound A (435)

| Dwell Time (msec) | Q1 PreBias (V) | CE | Q3 PreBias (V) | TB3 |
|---|---|---|---|---|
| 100.0 | -15.0 | -35.0 | -15.0 | |
| | | | | |
| | | | | |

431　432　433　434

ANALYSIS CONDITION DATA CONVERSION DEVICE, DATA PROCESSING SYSTEM AND ANALYSIS SYSTEM

BACKGROUND OF THE INVENTION

Field of the Invention

The present invention relates to an analysis condition data conversion device used by a data processing device for an analysis device, and a data processing system including the analysis condition data conversion device, and an analysis system including the analysis condition data conversion device.

Description of Related Art

A dedicated control device or control-data processing device is utilized in order to set a parameter (hereinafter referred to as an analysis parameter) indicating an analysis condition in each of various analysis devices such as a mass spectrometry device and display results of analysis acquired by an analysis device (see JP 2011-146000 A and JP 2016-45768 A, for example). Such a control device or a control-data processing device is configured by installation of a control program or a control-data processing program in a general-purpose personal computer or the like. Hereinafter, each of the control device and the control-data processing device for setting analysis parameters in an analysis device is referred to as a data processing device, and the control program or the control-data processing program is referred to as a data processing program.

A setting screen for the input of analysis parameters is displayed in a monitor of each of the data processing devices. When a user inputs values of analysis parameters in a plurality of setting items of a setting screen, the input values of the analysis parameters are reflected in an analysis device.

BRIEF SUMMARY OF THE INVENTION

The above-mentioned data processing program of the data processing device is dedicatedly prepared for each model of an analysis device. Setting screens of analysis parameters are different depending on data processing programs, and there is no compatibility among the different data processing programs. Therefore, even when a value of an analysis parameter used in an analysis device of a certain model is used in an analysis device of another model, it is necessary to input values of analysis parameters one by one in a plurality of setting items of a setting screen using a data processing program dedicated for each analysis device. In this case, an input error may occur.

Further, a value of an analysis parameter to be set in each analysis device may depend on the model of an analysis device. Therefore, a value of an analysis parameter of one model of an analysis device cannot be used in another model of the analysis device. As such, the user changes the value of the analysis parameter of the one model of the analysis device to a value fitted to the other model of the analysis device, and inputs the changed value in a data processing device for the other model of the analysis device. In this case, it is necessary to re-examine validity of the value of the analysis parameter in the other model of the analysis device.

An object of the present invention is to provide an analysis condition data conversion device, a data processing system and an analysis system capable of automatically converting a value of an analysis parameter included in first analysis condition data that is set in a first data processing device for a first analysis device into a value of the analysis parameter that is settable in a second data processing device for a second analysis device with no need for a user to manually change the value.

(1) An analysis condition data conversion device according to one aspect of the present invention includes an analysis condition data acquirer that acquires first analysis condition data indicating an analysis condition that is set in a first data processing device for a first analysis device, an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices, and a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

In the analysis condition data conversion device, the first analysis condition data that is set in the first data processing device for the first analysis device is acquired. The plurality of first analysis parameters included in the first analysis condition data are set in the first item that is dependent on the characteristics of the first analysis device and the second analysis device, and the second item that is not dependent on the characteristics of the first and second analysis devices. The value of the set first analysis parameter of the first item is converted into the value of the second analysis parameter corresponding to the second data processing device for the second analysis device. Further, the value of the set first analysis parameter of the second item is taken as the value of the second analysis parameter.

Thus, the value of the first analysis parameter included in the first analysis condition data that is set in the first data processing device for the first analysis device can be automatically converted into the value of the second analysis parameter that is settable in the second data processing device for the second analysis device with no need for the user to manually change the value.

(2) The item setter may set a third item in which a default value is to be set as a value of a second analysis parameter in the second data processing device. In this case, the default value can be easily set in the second data processing device as a value of an analysis parameter of the third item.

(3) The parameter value converter may convert a value of the first analysis parameter of the first item into a value of the second analysis parameter based on a predetermined conversion rule. In this case, the value of the first analysis parameter of the first item that is dependent on the characteristics of the first analysis device can be automatically converted into the value of the second analysis parameter fitted to the characteristics of the second analysis device.

(4) The conversion rule may be multiplication of a value of the first analysis parameter of the first item by a predetermined conversion coefficient. In this case, the value of the first analysis parameter that is dependent on the characteristics of the first and second analysis devices can be easily converted into the value of the second analysis parameter fitted to the second analysis device.

(5) The analysis condition data conversion device may further include a display that displays a conversion screen having a data paste region, wherein the analysis condition data acquirer may acquire data that is pasted in the data paste region as the first analysis condition data.

In this case, the user pastes the first analysis condition data in the paste region of the conversion screen, whereby the analysis condition data acquirer can easily acquire the first analysis condition data.

(6) The display may display a setting screen for the first analysis condition data of the first data processing device, and the analysis condition data acquirer may acquire data that is copied from the setting screen and pasted in the data paste region of the conversion screen as the first analysis condition data.

In this case, the user copies the first analysis condition data on the setting screen of the first data processing device and pastes the first analysis condition data in the paste region of the conversion screen, whereby the analysis condition data acquirer can easily acquire the first analysis condition data.

(7) The analysis condition data conversion device may further include a data format converter that converts a value of the second analysis parameter acquired by the parameter value converter into second analysis condition data having a format that is settable in the second data processing device. In this case, the first analysis condition data that is set in the first data processing device for the first analysis device can be converted into the second analysis condition data that is settable in the second data processing device for the second analysis device. Therefore, the first analysis condition data that is set in the first data processing device can be easily used in the second data processing device as the second analysis condition data without inputting the values of the analysis parameters one by one by the user.

(8) The data format converter may convert the second analysis condition data into an analysis condition file having a format that is importable by the second data processing device. In this case, the analysis condition file is imported by the second data processing device, so that the second analysis condition data can be easily set in the second data processing device.

(9) The first analysis device may be a first mass spectrometry device, the second analysis device is a second mass spectrometry device, and a first analysis parameter of the first item is a parameter relating to production of ions.

The parameter relating to the production of ions depends on the characteristics of the first and second analysis devices. In this case, the value that is set in the first data processing device is automatically converted to be fitted to the second data processing device with no change and no re-verification by the user for allowing the value of the parameter relating to the production of ions to be fitted to the second analysis device.

(10) Each of the first and second mass spectrometry devices may include a tandem mass spectrometer, a liquid chromatograph mass spectrometer or a gas chromatograph mass spectrometer, and the first analysis parameter of the first item may be collision energy in the tandem mass spectrometer, an interface voltage in the liquid chromatograph mass spectrometer or an emission current in the gas chromatograph mass spectrometer.

The collision energy, the interface voltage and the emission current depend on the characteristics of the first and second mass spectrometry devices. In this case, the value that is set in the first data processing device is automatically converted to be fitted to the second data processing device with no change and no re-verification by the user for allowing the value of the collision energy, the value of the interface voltage or the value of the emission current to be fitted to the second analysis device.

(11) A data processing system according to another aspect of the present invention includes an analysis condition data acquirer that acquires first analysis condition data indicating an analysis condition that is set in a first data processing device for a first analysis device, an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices, a second data processing device for the second analysis device, and a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

In the data processing system, the value of the first analysis condition data included in the first analysis condition data that is set in the first data processing device for the first analysis device can be automatically converted into the value of the second analysis parameter that is settable in the second data processing device for the second analysis device with no manual change of the value by the user.

(12) An analysis system according to yet another aspect of the present invention includes an analysis condition data acquirer that acquires first analysis condition data indicating an analysis condition that is set in a first data processing device for a first analysis device, a second analysis device, a second data processing device for the second analysis device, an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices, and a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

In the analysis system, the value of the first analysis parameter included in the first analysis condition data that is set in the first data processing device for the first analysis device can be automatically converted into the value of the second analysis parameter that is settable in the second data processing device for the second analysis device with no manual change of the value by the user.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 3 is a diagram showing examples of analysis parameters that are set in a first data processing device and a second data processing device;

FIG. 5 is a schematic diagram showing examples of a main setting screen and an extended setting screen displayed by the first data processing device;

FIG. 6 is a schematic diagram showing examples of a first setting screen, a second setting screen and an extended setting screen displayed by the second data processing device;

DESCRIPTION OF THE PREFERRED EMBODIMENTS

An analysis condition data conversion device, a data processing system and an analysis system according to embodiments of the present invention will be described below in detail with reference to drawings. The analysis system according to the present embodiment is a mass spectrometry system.

(1) Configuration of Analysis System According to Embodiments

Figure 1:
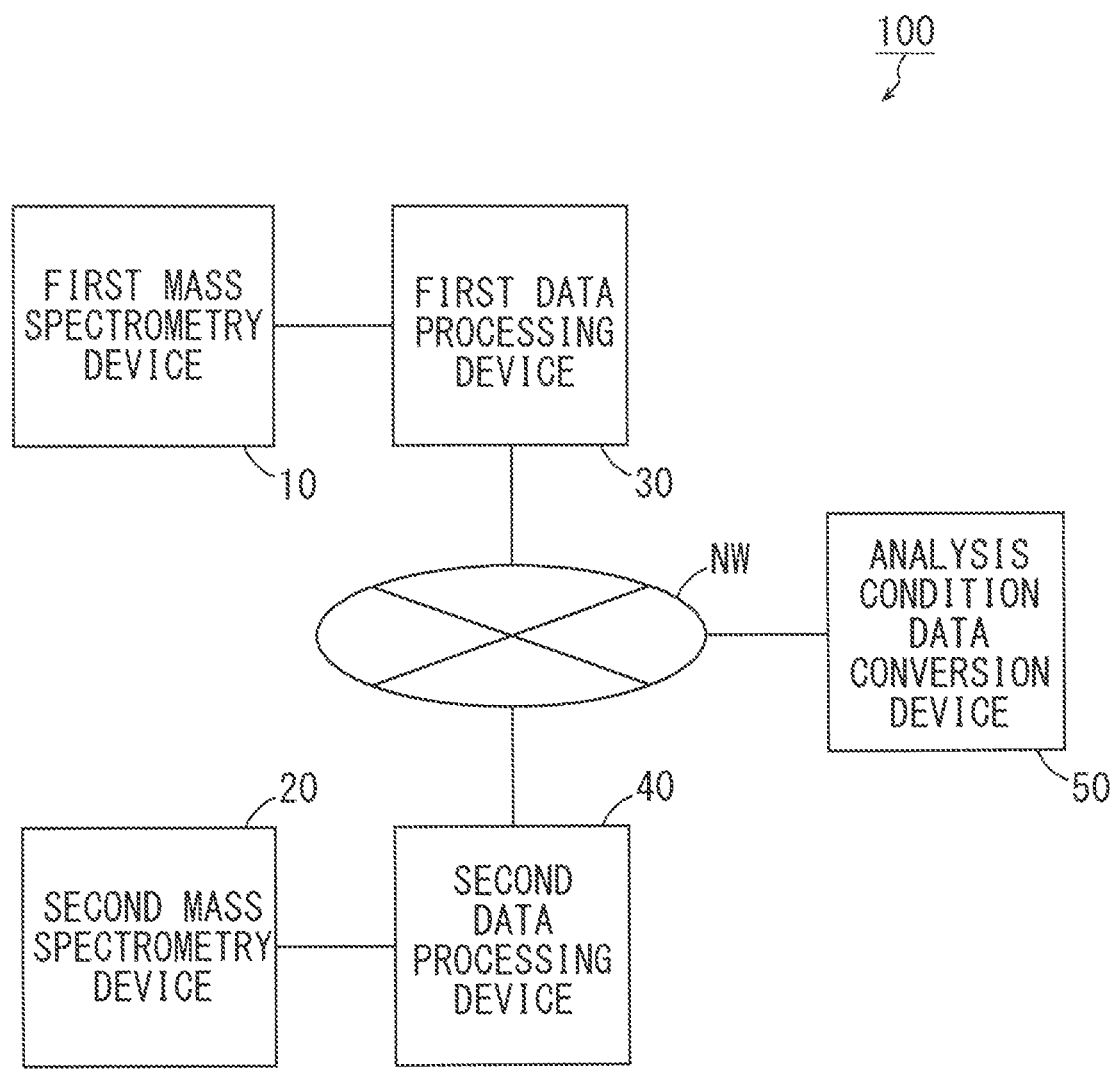
FIG. 1 is a block diagram showing a configuration of an analysis system including an analysis condition data conversion device according to one embodiment of the present invention.

FIG. 1 is a block diagram showing a configuration of the analysis system including the analysis condition data conversion device according to one embodiment of the present invention. The analysis system 100 of FIG. 1 includes a first mass spectrometry device 10, a second mass spectrometry device 20, a first data processing device 30, a second data processing device 40 and an analysis condition data conversion device 50. The first mass spectrometry device 10, the second mass spectrometry device 20, the first data processing device 30, the second data processing device 40 and the analysis condition data conversion device 50 are connected to a network NW such as a LAN (Local Area Network).

In the present embodiment, the first mass spectrometry device 10 includes a triple quadrupole liquid chromatograph mass spectrometer (LS/MS/MS) that is capable of measurement using Multiple Reaction Monitoring (hereinafter abbreviated as MRM). Similarly, the second mass spectrometry device 20 also includes a triple quadrupole liquid chromatograph mass spectrometer (LS/MS/MS) that is capable of measurement using MRM. The model of the first mass spectrometry device 10 is different from that of the second mass spectrometry device 20.

The first data processing device 30 is used to set analysis conditions (analysis methods) of the first mass spectrometry device 10 and examine results of analysis acquired by the first mass spectrometry device 10. The first data processing device 30 is configured by a computer such as a personal computer and a first data processing program. Analysis condition data (hereinafter referred to as first analysis condition data) indicating analysis conditions of the first mass spectrometry device 10 is set in the first data processing device 30. The first analysis condition data includes values of a plurality of analysis parameters of the first mass spectrometry device 10 and has a data format that is settable in the first data processing device 30.

A user can set a value of each analysis parameter of the first analysis condition data using an operation unit of the first data processing device 30. The set value of each analysis parameter of the first analysis condition data is displayed in a display of the first data processing device 30. The first data processing device 30 sets analysis conditions of the first mass spectrometry device 10 based on the first analysis condition data.

The second data processing device 40 is used to set analysis conditions (analysis methods) of the second mass spectrometry device 20 and examine results of analysis acquired by the second mass spectrometry device 20. The second data processing device 40 is configured by a computer such as a personal computer and a second data processing program. Analysis condition data (hereinafter referred to as second analysis condition data) indicating analysis conditions of the second mass spectrometry device 20 is set in the second data processing device 40. The second analysis condition data includes values of a plurality of analysis parameters. The second analysis condition data has a data format that is settable in the second data processing device 40.

The user can set a value of each analysis parameter of the second analysis condition data using an operation unit of the second data processing device 40. The set value of each analysis parameter of the second analysis condition data is displayed in a display of the second data processing device 40. The second data processing device 40 sets analysis conditions in the second mass spectrometry device 20 based on the second analysis condition data.

The user can export the second analysis condition data that is set in the second data processing device 40 in the form of an analysis condition file. Further, the user can import the exported analysis condition file to the second data processing device 40. Thus, the second analysis condition data can be set in the second data processing device 40 based on the imported analysis condition file. The analysis condition file that is importable (writable) to the second data processing device 40 has a specific data format. In the present embodiment, the analysis condition file that is importable to the second data processing device 40 is a CSV (Comma Separated Value) formatted text file, for example.

The analysis condition data conversion device 50 converts the first analysis condition data that is set in the first data processing device 30 into the second analysis condition data to be fitted to the second mass spectrometry device 20. The analysis condition data conversion device 50 is configured by a computer such as a personal computer and an analysis condition data conversion program. Details of the configuration of the analysis condition data conversion device 50 will be described below.

The second mass spectrometry device 20, the second data processing device 40 and the analysis condition data conversion device 50 of the analysis system 100 according to the present embodiment may constitute one analysis system. Further, the second data processing device 40 and the analysis condition data conversion device 50 may constitute a data processing system. In this case, the second data processing device 40 and the analysis condition data conversion device 50 may be configured by installation of the first data processing program and the analysis condition data conversion program in the same computer.

(2) Configuration of Hardware of Analysis Condition Data Conversion Device

Figure 2:
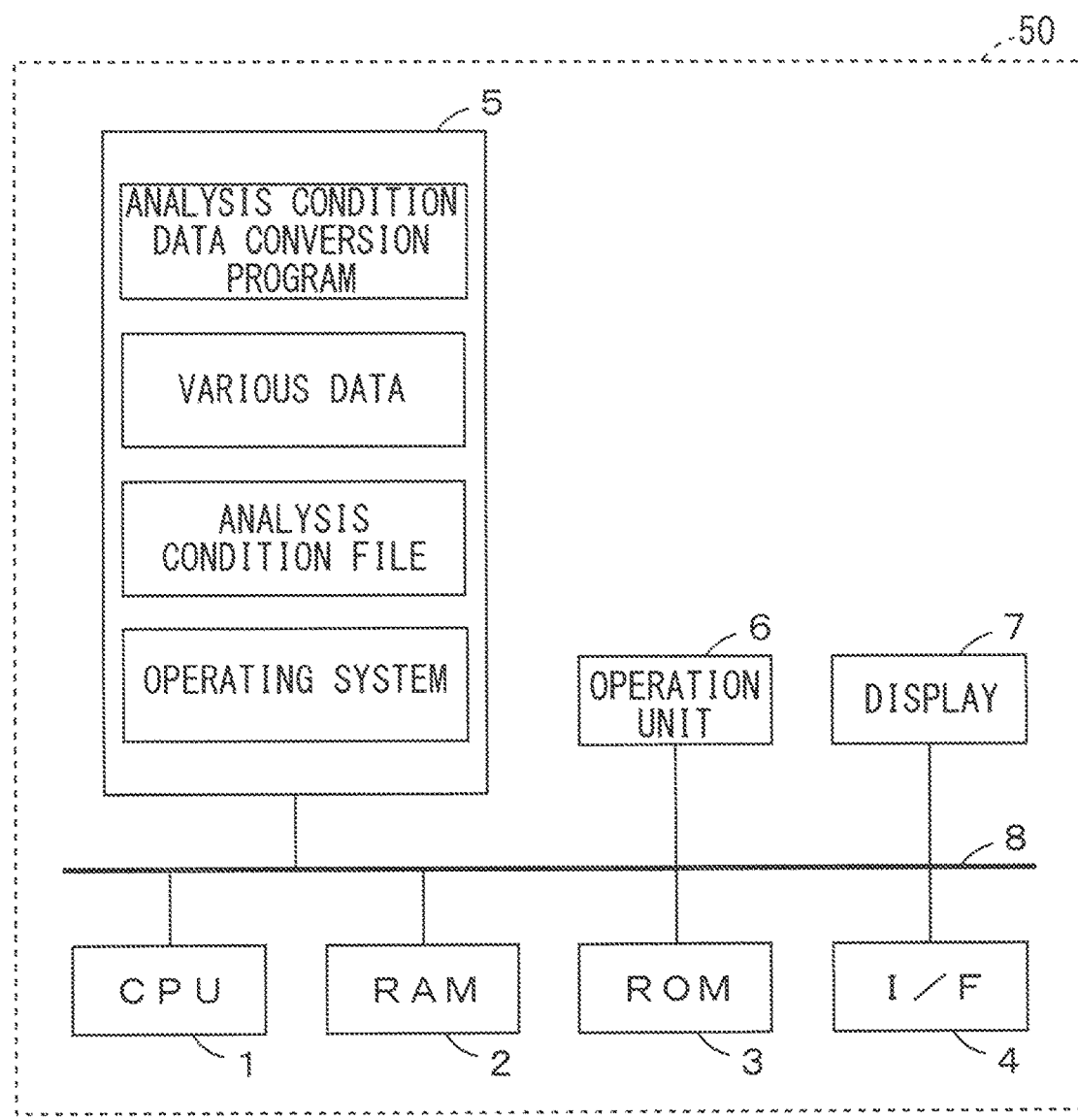
FIG. 2 is a block diagram showing a configuration of hardware of the analysis condition data conversion device of FIG. 1.

FIG. 2 is a block diagram showing a configuration of the hardware of the analysis condition data conversion device 50 of FIG. 1. As shown in FIG. 2, the analysis condition data conversion device 50 is constituted by a CPU (Central Processing Unit) 1, a RAM (Random Access Memory) 2, a ROM (Read Only Memory) 3, an input output interface (I/F) 4, a storage device 5, an operation unit 6 and a display 7. The CPU 1, the RAM 2, the ROM 3, the input output interface 4, the storage device 5, the operation unit 6 and the display 7 are connected to a bus 8.

The storage device 5 includes a storage medium such as a hard disc or a semiconductor memory and stores the analysis condition data conversion program, various data, an analysis condition file, an operation system and the like. A system program is stored in the ROM 3. The RAM 2 is used as a work area for the CPU 1. The CPU 1 executes the analysis condition data conversion program stored in the storage device 5 on the RAM 2, whereby below-mentioned analysis condition data conversion processing is performed. The input output interface 4 is connected to the network NW of FIG. 1.

The operation unit 6 is an input device such as a keyboard, a mouse or a touch panel. The display 7 is a display device such as a liquid crystal display device. The user can give various instructions to the analysis condition data conversion device 50 using the operation unit 6. A below-mentioned analysis condition data conversion screen is displayed in the display 7. In the present embodiment, because being connected to the first data processing device 30 and the second data processing device 40 via the network NW, the analysis condition data conversion device 50 can give various instructions to and input data in the first data processing device 30 and the second data processing device 40 with use of the operation unit 6. Further, setting screens of the first data processing device 30 and the second data processing device 40 can be displayed in the display 7.

(3) Types of Analysis Parameters

FIG. 3 is a diagram showing an example of the analysis parameters that are set in the first data processing device 30 and the second data processing device 40. The plurality of analysis parameters are classified into items (hereinafter referred to as device non-dependent items) to which parameters that are not dependent on the model of the mass spectrometry device belong, an item (hereinafter referred to as a device dependent item) to which the parameter that is dependent on the model of the mass spectrometry device belongs and items (hereinafter referred to as default value items) to which the parameters that are set to default values belong. The parameters that belong to the device non-dependent item are referred to as device non-dependent parameters, the parameter that belongs to the device dependent item is referred to as a device dependent parameter and the parameters that belong to the default value items are referred to as default value parameters.

In the present embodiment, as shown in FIG. 3, the device non-dependent parameters include a precursor ion m/z (a mass to charge ratio), a product ion m/z, a retention time and a compound name. The device dependent parameter includes collision energy. The default value parameters include a Q1 pre bias voltage, a Q3 pre bias voltage and a dwell time.

In the first mass spectrometry device 10, the precursor ion m/z is expressed by "Q1 mass," the product ion m/z is expressed by "Q3 mass," the retention time is expressed by "Time" and the compound name is expressed by "ID." In addition, the collision energy is expressed by "CE." Further, the Q1 pre bias voltage is expressed by "Prefilter," the Q3 pre bias voltage is expressed by "Collision Cell Exit Potential" and the dwell time is expressed by "Dwell Time."

On the other hand, in the second mass spectrometry device 20, the precursor ion m/z is expressed by "Precursor m/z," the product ion m/z is expressed by "Product m/z," the retention time is expressed by "Ret. Time" and the compound name is expressed by "Compound Name." Further, the collision energy is expressed by "CE." Further, the Q1 pre bias voltage is expressed by "Q1 Pre Bias," the Q3 pre bias voltage is expressed by "Q3 Pre Bias," and the dwell time is expressed by "Dwell Time."

(4) Functional Configuration of Analysis Condition Data Conversion Device 50

Figure 4:
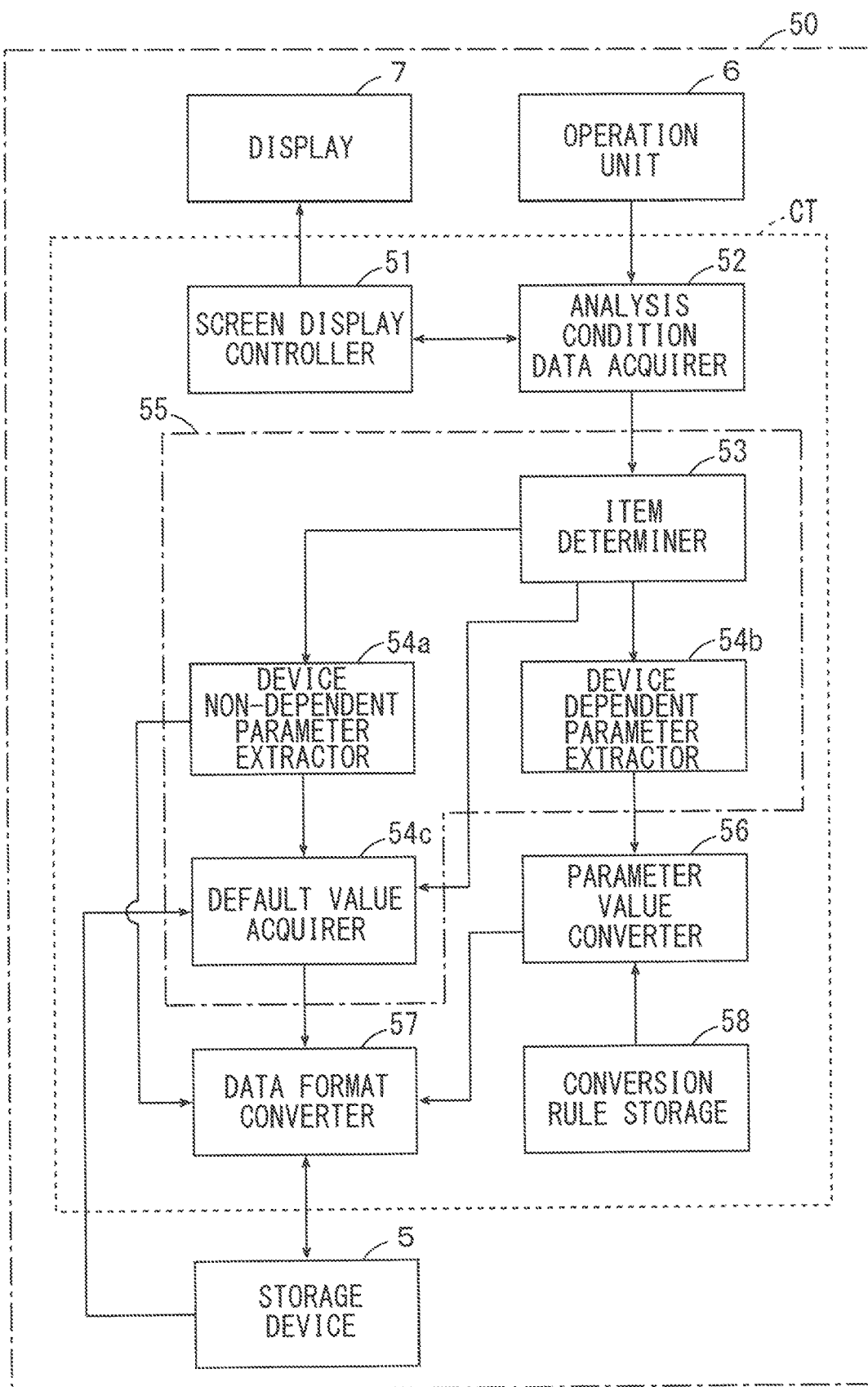
FIG. 4 is a block diagram showing a functional configuration of the analysis condition data conversion device of FIG. 2.

FIG. 4 is a block diagram showing a functional configuration of the analysis condition data conversion device 50 of FIG. 2. As shown in FIG. 4, the analysis condition data conversion device 50 is constituted by a conversion tool CT, the operation unit 6, the display 7 and the storage device 5.

The conversion tool CT includes a screen display controller 51, an analysis condition data acquirer 52, an item determiner 53, a device non-dependent parameter extractor 54a, a device dependent parameter extractor 54b, a default value acquirer 54c, a parameter value converter 56, a data format converter 57 and a conversion rule storage 58. The item determiner 53, the device non-dependent parameter extractor 54a, the device dependent parameter extractor 54b and the default value acquirer 54c constitute the item setter 55. The CPU 1 of FIG. 2 executes the analysis condition data conversion program stored in the storage device 5, whereby functions of respective constituent elements of the conversion tool CT are implemented. Part or all of the constituent elements of the conversion tool CT may be implemented by hardware such as an electronic circuit.

The screen display controller 51 allows the display 7 to display the analysis condition data conversion screen based on the prepared screen data. The analysis condition data acquirer 52 acquires the first analysis condition data from the analysis condition data conversion screen based on an operation of the operation unit 6. A method of acquiring first analysis condition data will be described below. The item setter 55 sets each analysis parameter included in the first analysis condition data acquired by the analysis condition data acquirer 52 in one of the device non-dependent items, the device dependent item and the default value items. Specifically, the item determiner 53 determines whether each analysis parameter of the first analysis condition data is a device non-dependent parameter that belongs to the device non-dependent item, a device dependent parameter that belongs to the device dependent item or a default value parameter that belongs to the default value item. For example, the relationship between the type of each analysis parameter and the type of the item is stored in advance.

The device non-dependent parameter extractor 54a extracts values of the device non-dependent parameters from the first analysis condition data acquired by the analysis condition data acquirer 52. The device dependent parameter extractor 54b extracts a value of the device dependent parameter from the first analysis condition data acquired by the analysis condition data acquirer 52. The default value acquirer 54c acquires default values of the default value parameters to be set in the second data processing device 40. The default values of the predetermined value parameters are stored in the storage device 5 in advance. The default value acquirer 54c may acquire the default values of the default value parameters from the second data processing device 40.

The conversion rule storage 58 stores a conversion rule for converting the value of a device dependent parameter that is set in the first data processing device 30 into the value fitted to the second mass spectrometry device 20. In the present example, the conversion rule is multiplication by a predetermined conversion coefficient. In this case, the conversion rule storage 58 stores the conversion coefficient.

The inventors of the present invention have compared the values of the analysis parameters that are set in the first data processing device 30 and the values of the analysis parameters that are set in the second data processing device 40 regarding 58 types of compounds, and discovered that there is a correlation between the value of the collision energy in the first mass spectrometry device 10 and the value of the collision energy in the second mass spectrometry device 20, which is not dependent on the type of each compound. As a result, the inventors of the present invention have found out that the value of the collision energy in the first mass spectrometry device 10 can be converted into the value of the collision energy in the second mass spectrometry device 20 with use of a certain conversion coefficient.

The conversion coefficient is determined by the following determination method, for example. The first and second data processing devices 30, 40 have a voltage optimization function. With the voltage optimization function, the set compound is analyzed using a plurality of collision energy values, a plurality of Q1 pre bias voltage values, a plurality of Q3 pre bias voltage values in the first and second mass spectrometry devices 10, 20, and it is determined that the collision energy value with which maximum peak intensity is obtained is the optimal collision energy value. The optimal Q1 pre bias voltage value and the optimal Q3 pre bias voltage value are determined similarly. The ratio of the average collision energy value of the plurality of compounds obtained by the first mass spectrometry device 10 and the first data processing device 30, and the average collision energy value of the plurality of compounds obtained by the second mass spectrometry device 20 and the second data processing device 40 is determined as a conversion coefficient.

The parameter value converter 56 converts the value of the device dependent parameter extracted by the device dependent parameter extractor 54b into the value fitted to the second mass spectrometry device 20 based on the conversion rule stored in the conversion rule storage 58. In the present embodiment, the parameter value converter 56 multiplies the value of the device dependent parameter extracted by the device dependent parameter extractor 54b by the conversion coefficient. Thus, the value of the device dependent parameter fitted to the second mass spectrometry device 20 is obtained.

The data format converter 57 converts the analysis condition data including the values of the device non-dependent parameters extracted by the device non-dependent parameter extractor 54a, the value of the device dependent parameter acquired by the parameter value converter 56 and the values of the default value parameters acquired by the default value acquirer 54c into the second analysis condition data having a predetermined data format. Further, the data format converter 57 stores the second analysis condition data in the storage device 5 in the form of an analysis condition file after conversion. Here, the predetermined data format is the data format that is importable to the second data processing device 40.

(5) Example of Setting Screen in First Data Processing Device 30

Figure 5:
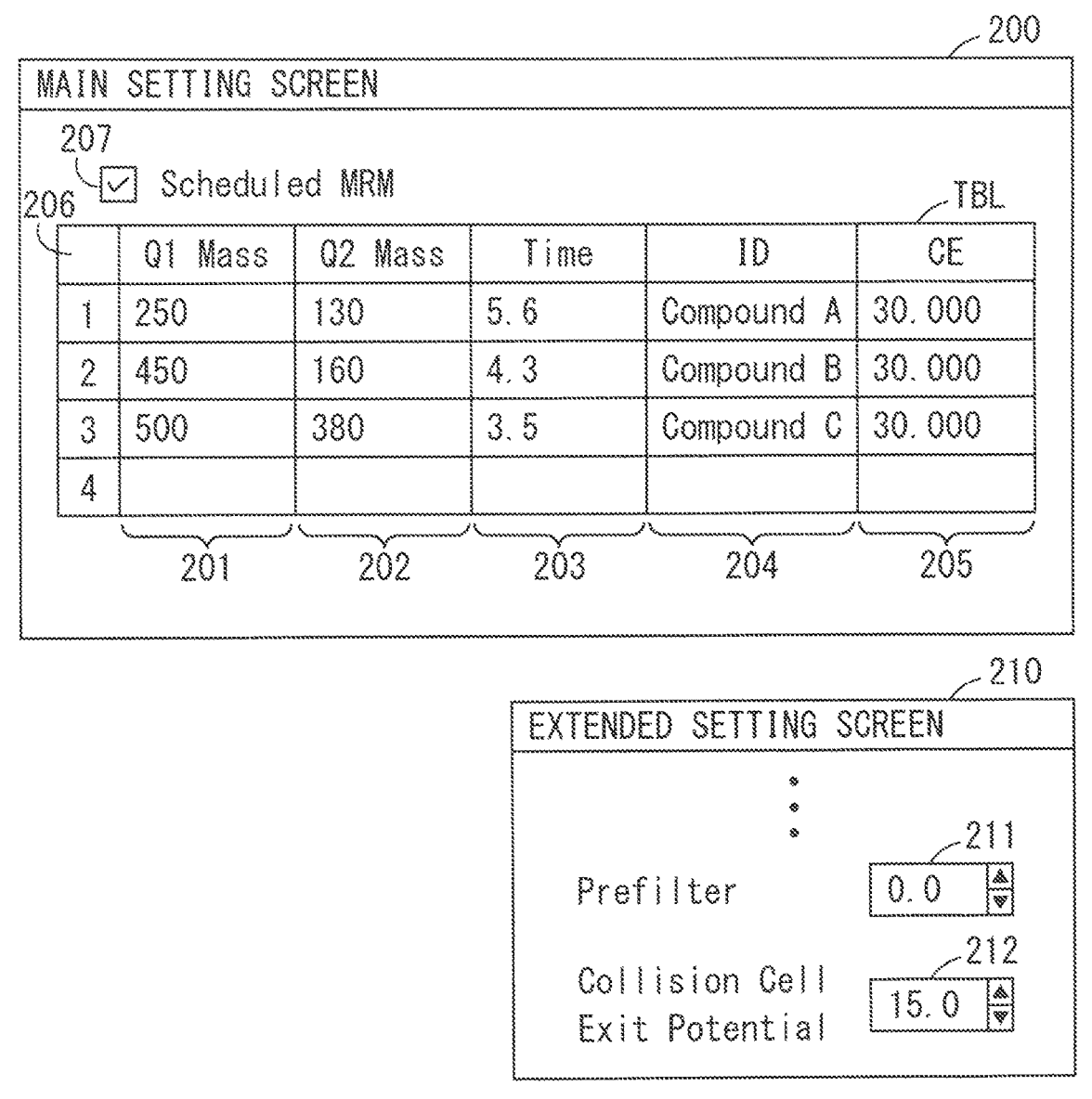

FIG. 5 is a schematic diagram showing examples of a main setting screen and an extended setting screen displayed by the first data processing device 30. The user can allow the display of the first data processing device 30 or the display 7 of the analysis condition data conversion device 50 to display the main setting screen 200 of FIG. 5.

The main setting screen includes a parameter table TBL. The parameter table TBL includes an input field 201 for the precursor ion m/z, an input field 202 for the product ion m/z, an input field 203 for the retention time, an input field 204 for the compound name, an input field 205 for the collision energy and a selection field 206. Further, the main setting screen 200 further includes a checkbox 207 that indicates whether the first mass spectrometry device 10 is set in a Scheduled MRM measurement mode. When the check box 207 is checked, the retention time is displayed in the input field 203. When the checkbox 207 is unchecked, the dwell time is displayed in the input field 203.

The user can input values of the device non-dependent parameters in the input fields 201 to 204. Further, the user can input values of the device dependent parameter in the input field 205. The values of the default value parameters are set to the predetermined default values. In the present embodiment, the Q1 pre bias voltage, the Q3 pre bias voltage and the dwell time are respectively set to the default values.

The user can allow the display of the first data processing device 30 or the display 7 of the analysis condition data conversion device 50 to display the extended setting screen 210. The extended setting screen 210 has an input field 211 for the Q1 pre bias voltage and an input field 212 for the Q3 pre bias voltage. The automatically set values of the default value parameters are displayed in the input fields 211, 212. The user can change the values in the input fields 211, 212 using the operation unit of the first data processing device 30 or the operation unit 6 of the analysis condition data conversion device 50. Further, the user can confirm the default values of the dwell time by allowing the display of the first data processing device 30 or the display 7 of the analysis condition data conversion device 50 to display another screen (not shown).

(6) Example of Setting Screen in Second Data Processing Device 40

FIG. 6 is a schematic diagram showing examples of a first setting screen, a second setting screen and an extended setting screen displayed by the second data processing device 40. The user can allow the display of the second data processing device 40 or the display 7 of the analysis condition data conversion device 50 to display the first setting screen 410 and the second setting screen 420 of FIG. 6.

The first setting screen 410 includes a parameter table TB1 and an input field 415 for the compound name. The parameter table TB1 includes an input field 411 for the precursor ion m/z, an input field 412 for the product ion m/z, an input field 413 for the dwell time and an input field 414 for the collision energy.

The second setting screen 420 includes a parameter table TB2. The parameter table TB2 includes an input field 421 for the compound name, an input field 422 for the type, an input field 423 for m/z and an input field 424 for the retention time.

The user can input values of the device non-dependent parameters in the input fields 411, 412 of the first setting screen 410 and the input field 424 of the second setting screen 420. Further, the user can input values of the device dependent parameter in the input field 414 of the first setting screen 410.

The values of the default value parameters are set to the predetermined default values. In the present embodiment, the Q1 pre bias voltage, the Q3 pre bias voltage and the dwell time are respectively set to the default values. The default value of the dwell time is displayed in the input field 413 of the first setting screen 410.

In the parameter table TB1 of the first setting screen 410, the values of the analysis parameters relating to the compound specified by the compound name that is input in the input field 415 are displayed. In the example of FIG. 6, the values of the analysis parameters corresponding to the compound "Compound A" are displayed in the first channel Ch.

In the parameter table TB2 of the second setting screen 420, values of the analysis parameters corresponding to a plurality of compounds are displayed. In the example of FIG. 6, the values of the analysis parameters corresponding to the compounds "Compound A", "Compound B" and "Compound C" are displayed. In the input field 422, the type of each compound is displayed. The user can select internal standard, reference or internal standard-reference as the type to be displayed in the input field 422 in addition to the analysis subject "Target". In the input field 423, the value of the precursor ion m/z and the value of the product ion m/z are displayed for each compound. In the input field 424, the value of the retention time relating to each compound is displayed.

The user can allow the display of the second data processing device 40 or the display 7 of the analysis condition data conversion device 50 to display the extended setting screen 430. The extended setting screen 430 includes a parameter table TB3 and an input field 435 for the compound name. In the parameter table TB3, an input field 431 for the dwell time, an input field 432 for the Q1 pre bias voltage, an input field 433 for the collision energy and an input field 434 for the Q3 bias voltage are displayed. In the input fields 431, 433, 435, the value of the dwell time, the value of the collision energy and the compound name that are the same as the values and the name in the input fields 413, 414, 415 of the first setting screen 410 are respectively displayed. In the input fields 432, 434, the automatically set values of the default value parameters are displayed. The user can change the values of the default value parameters displayed in the input fields 432, 434 of the extended setting screen 430.

As described below, the second analysis condition data that is settable in the second data processing device 40 can be produced with use of the analysis condition data conversion device 50 based on the first analysis condition data that is set in the first data processing device 30.

(7) Example of Analysis Condition Data Conversion Screen

Figure 7:
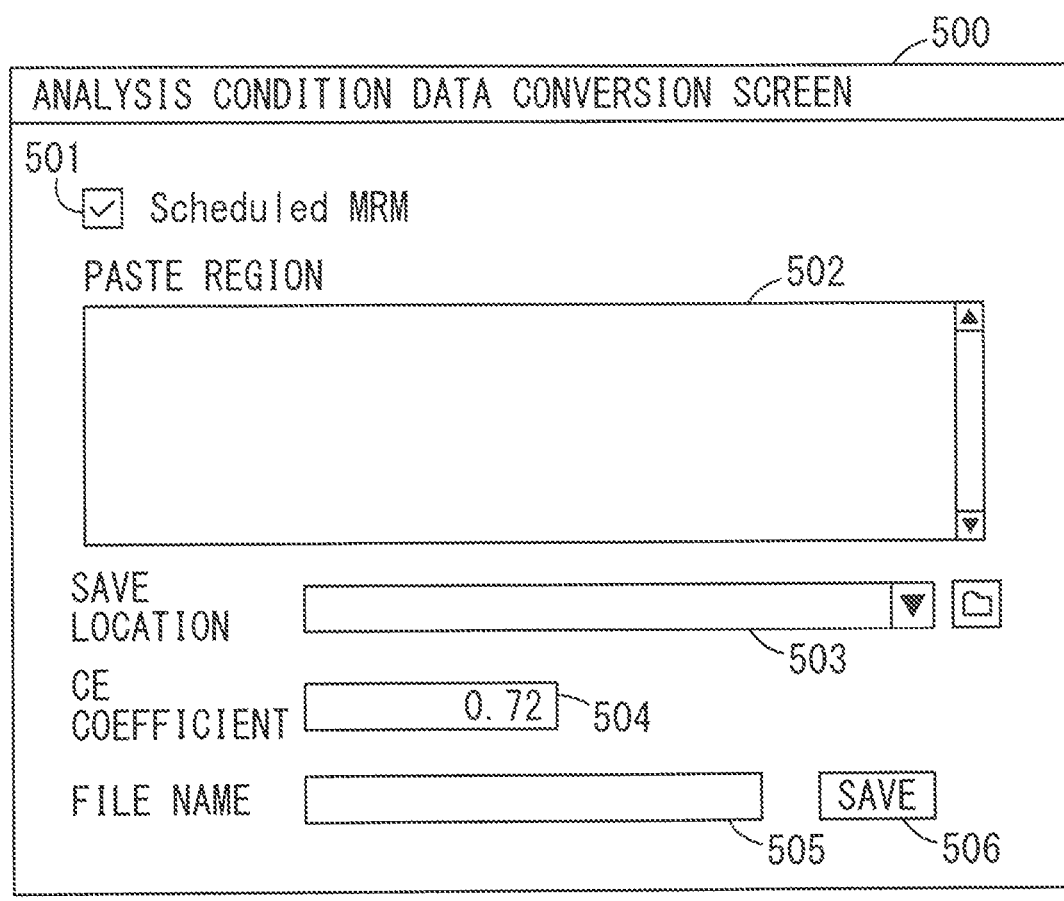
FIG. 7 is a schematic diagram showing an example of an analysis condition data conversion screen displayed in a display by the analysis condition data conversion device.

FIG. 7 is a schematic diagram showing an example of the analysis condition data conversion screen displayed in the display 7 by the analysis condition data conversion device 50. The user can allow the analysis condition data conversion screen 500 of FIG. 6 to be displayed in the display 7 using the operation unit 6.

The analysis condition data conversion screen 500 includes a checkbox 501 for indicating whether the first mass spectrometry device 10 is set in the Scheduled MRM measurement mode and a paste region 502 in which the first analysis condition data of the first data processing device 30 is to be pasted. Further, the analysis condition data conversion screen 500 includes an input field 503 for indicating the save location of an analysis condition file, a display field 504 for displaying a CE (collision energy) coefficient that is a conversion coefficient, an input field 505 for the file name and a save button 506. The user can change the CE coefficient displayed in the display field 504.

(8) Analysis Condition Data Conversion Processing

Figure 8:
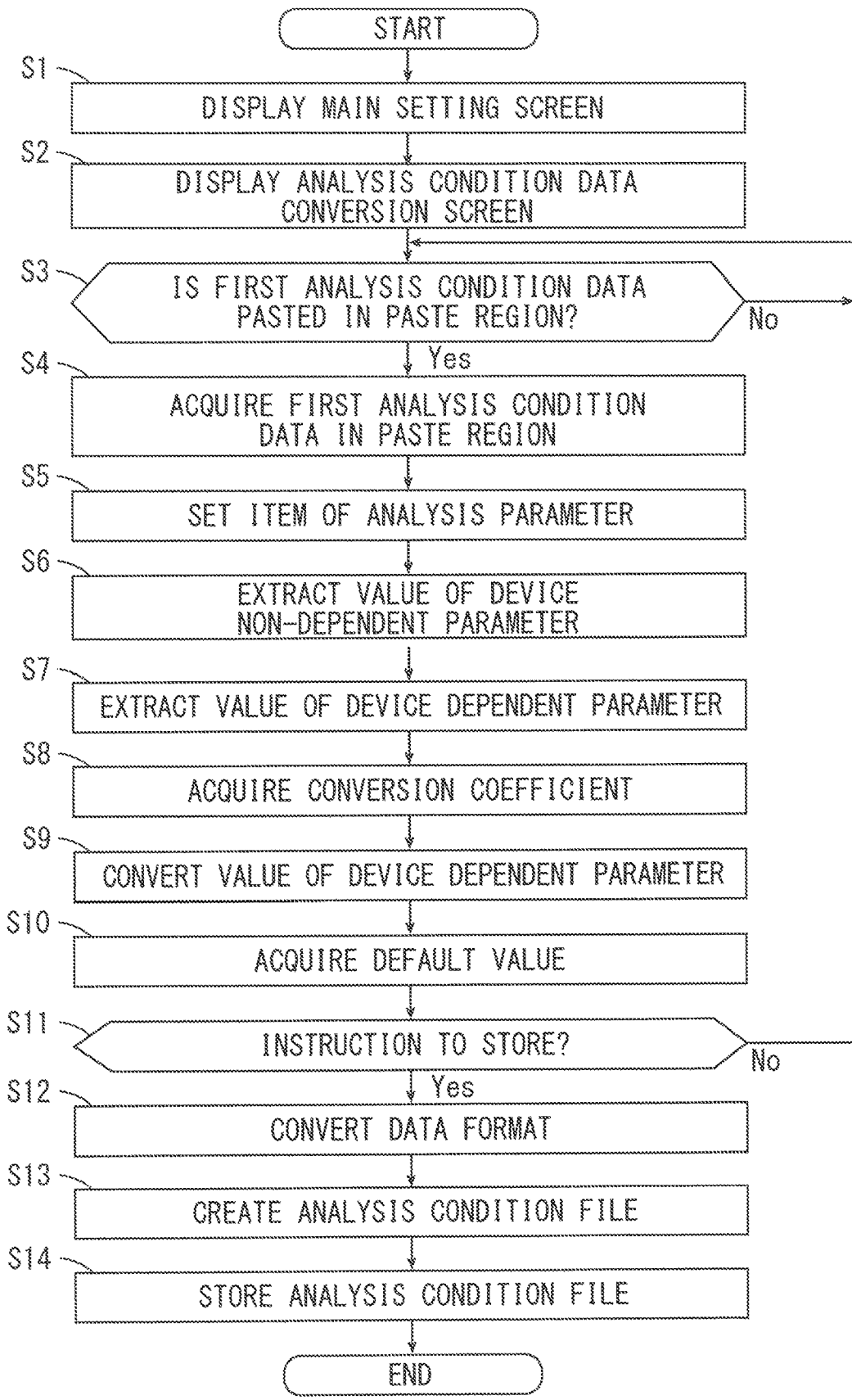
FIG. 8 is a flow chart showing analysis condition data conversion processing by the analysis condition data conversion device.

Next, the analysis condition data conversion processing with use of the analysis condition data conversion device 50 of FIG. 4 will be described. FIG. 8 is a flow chart showing the analysis condition data conversion processing by the analysis condition data conversion device 50. The analysis condition data conversion program executed by the CPU 1 enables the analysis condition data conversion processing of FIG. 8 to be performed.

The user activates the analysis condition data conversion program using the operation unit 6. The screen display controller 51 of FIG. 4 allows the display 7 to display the main setting screen 200 of FIG. 5 (step S1). Further, the screen display controller 51 allows the display 7 to display the analysis condition data conversion screen 500 of FIG. 7 (step S2).

The user selects and copies the parameter table TBL by designating the selection field 206 of the main setting screen 200 using the operation unit 6. Thus, the values of the analysis parameters of the input fields 201 to 205 are stored in a clipboard (storage region) of an operating system. Next, the user pastes the contents of the clipboard in the paste region 502 of the analysis condition data conversion screen 500 using the operation unit 6. In this case, the first analysis condition data is pasted in the paste region 502 in the form of text data.

The screen display controller 51 determines whether the first analysis condition data has been pasted in the paste region 502 of the analysis condition data conversion screen 500 (step S3). When the first analysis condition data is pasted in the paste region 502, the analysis condition data acquirer 52 of FIG. 4 acquires the first analysis condition data in the paste region 502 (step S4). The item determiner 53 determines to which one of the device non-dependent item, the device dependent item and the default value item each analysis parameter of the first analysis condition data acquired by the analysis condition data acquirer 52 belongs (step S5). Thus, the item of each analysis parameter is set.

Then, the device non-dependent parameter extractor 54a of FIG. 4 extracts the values of the device non-dependent parameters from the first analysis condition data acquired by the analysis condition data acquirer 52 (step S6). In the example of FIG. 5, the value of the precursor ion m/z in the input field 201, the value of the product ion m/z in the input field 202, the value of the retention time in the input field 203 and the compound name in the input field 204 are extracted as the values of the device non-dependent parameters.

The device dependent parameter extractor 54b of FIG. 4 extracts the value of the device dependent parameter from the first analysis condition data acquired by the analysis condition data acquirer 52 (step S7). In the example of FIG. 5, the value of the collision energy in the input field 205 is extracted as the value of the device dependent parameter.

Next, the parameter value converter 56 of FIG. 4 acquires the conversion coefficient stored in the conversion rule storage 58 (step S8). In the present embodiment, the collision energy coefficient is displayed in the display field 504 of the analysis condition data conversion screen 500 of FIG. 7 as the conversion coefficient. Further, the parameter value converter 56 converts the value of the device dependent parameter into the value fitted to the second mass spectrometry device 20 by multiplying the value of the device dependent parameter extracted by the device dependent parameter extractor 54b by the acquired conversion coefficient (step S9). In the example of FIG. 7, the value of the collision energy is multiplied by the value of the CE coefficient. Further, the default value acquirer 54c acquires the default value of the default value parameter stored in the storage device 5 (step S10).

Next, the data format converter 57 determines whether the user has given an instruction for saving the analysis condition file (step S11). In the example of FIG. 7, the user can give an instruction for saving the analysis condition file by operating the save button 506.

When the instruction for saving the analysis condition file is given, the data format converter 57 converts the values of the device non-dependent parameters extracted by the device non-dependent parameter extractor 54a, the value of the device dependent parameter obtained by conversion by the parameter value converter 56 and the values of the default value parameters acquired by the default value acquirer 54c into a predetermined data format (step S12). Thus, the second analysis condition data is obtained. Further, the data format converter 57 creates an analysis condition file including the second analysis condition data (step S13). As described above, in the present embodiment, the analysis condition file is a CSV formatted text file, for example. The data format converter 57 stores the analysis condition file in the storage device 5 (step S14), and ends the analysis condition data conversion processing.

When the user re-pastes the first analysis condition data in the paste region 502 without operating the save button 506 in the step S10, the processing of the steps S3 to S11 is performed again.

The user can import the analysis condition file saved in the storage device 5 of the analysis condition data conversion device 50 to the second data processing device 40 by operating the operation unit 6. Thus, the second analysis condition data is set in the second data processing device 40. In this case, the values of the plurality of analysis parameters of the set second analysis condition data are displayed in the input fields 411 to 415 of the first setting screen 410 of FIG. 6, the input fields 421 to 424 of the second setting screen 420 and the input fields 431 to 435 of the extended setting screen 430. In this case, the values of the analysis parameters relating to all of the compounds in the second analysis condition data of the analysis condition file are set in the first channel Ch, and an event corresponding to the analysis condition file is produced.

When the check box 501 of FIG. 7 is unchecked, the value of the retention time of the first analysis condition data that is pasted in the paste region 502 as the retention time is not used, and the default value in the second data processing device 40 is used.

(9) Effects of Embodiments

In the analysis condition data conversion device 50 according to the present embodiment, the first analysis condition data that is set in the first data processing device 30 for the first mass spectrometry device 10 is converted into the second analysis condition data that is settable in the second data processing device 40 for the second mass spectrometry device 20, and the second analysis condition data is stored in the form of the analysis condition file that is importable by the second data processing device 40. In this case, the values that are set in the first data processing device 30 are used as the values of the device non-dependent parameters, and the values obtained by conversion based on the conversion rule are used as the values of the device non-dependent parameters.

Therefore, the user can easily diverse the first analysis condition data that is set in the first data processing device 30 to the second data processing device 40 as the second analysis condition data by importing the analysis condition file to the second data processing device 40 without inputting the values of the analysis parameters one by one. Thus, an input error of the values of the analysis parameters by the user does not occur. Further, because the validity of the conversion rule is examined in advance, there is no need for the user to re-examine the validity of the value of each analysis parameter that is set in the second data processing device 40.

Further, because the second analysis condition data includes the values of the default value parameters, the default values of the default value parameters can be collectively set in the second data processing device 40 together with the values of the device non-dependent parameters and the value of the device dependent parameter.

Further, the user only need to copy the parameter table TBL of the main setting screen 200 of the first data processing device 30 and paste the parameter table TBL in the paste region 502 of the analysis condition data conversion screen 500 of the analysis condition data conversion device 50 in order for the first analysis condition data to be acquired by the analysis condition data conversion device 50. Therefore, a user's workload of inputting the first analysis condition data in the analysis condition data conversion device 50 does not increase.

(10) Another Example of Conversion Rule

The conversion rule of the value of the device dependent parameter is not limited to the multiplication by the conversion coefficient. For example, the conversion rule may be search of a library. Specifically, results of analysis by the second mass spectrometry device 20 are stored in the library for each compound together with the analysis condition data (second analysis condition data). The compounds in the library are searched using the value of one of the device non-dependent parameters included in the first analysis condition data as a search key, and the value of the device dependent parameter that is set for the searched compound is extracted as the value of the device dependent parameter after conversion. Thus, the value of the device dependent parameter that is set in the first data processing device 30 is converted into a value fitted to the second mass spectrometry device 20.

(11) Other Embodiments (a) The present invention is also applied to the case where each of the first and second mass spectrometry devices 10, 20 includes another mass spectrometer such as a liquid chromatograph mass spectrometer (LC/MS), a gas chromatograph mass spectrometer (GC/MS) or an ion chromatograph mass spectrometer. When each of the first and second mass spectrometry devices 10, 20 includes a liquid chromatograph mass spectrometer (LC/MS), an interface voltage in the interface between the liquid chromatograph and the mass spectrometer is a device dependent parameter. When each of the first and second mass spectrometry devices 10, 20 includes a gas chromatograph mass spectrometer (GC/MS), an emission current flowing in a filament of an ion source is a device dependent parameter.

(b) The present invention is also applied to the case where the first and second mass spectrometry devices 10, 20 include various mass spectrometers such as a time-of-flight mass spectrometer, a triple quadrupole chromatograph mass spectrometer, a single quadrupole chromatograph mass spectrometer, a mass spectrometer using an ion source and a matrix-assisted laser desorption ionization (MALDI) technique, an ion trap mass spectrometer or a fourier transform ion cyclotron resonance mass spectrometer.

(c) The present invention can be applied to not only the case where each of the first and second analysis devices is a mass spectrometry device but also the case where each of the first and second analysis devices is another analysis device having a device dependent parameter and device non-dependent parameters.

(d) While the first data processing device 30, the second data processing device 40 and the analysis condition data conversion device 50 are respectively configured by installation of each of the first data processing program, the second data processing program and the analysis condition data conversion program in a separate computer in the above-mentioned embodiment, the present invention is not limited to this.

For example, the first data processing device 30, the second data processing device 40 and the analysis condition data conversion device 50 may be configured by installation of the first data processing program, the second data processing program and the analysis condition data conversion program in the same computer. Further, the first data processing device 30, the second data processing device 40 and the analysis condition data conversion device 50 may be configured by installation of two of the first data processing program, the second data processing program and the analysis condition data conversion program in the same computer, and installation of remaining one of the first data processing program, the second data processing program and the analysis condition data conversion program in another computer.

While the first data processing device 30, the second data processing device 40 and the analysis condition data conversion device 50 are connected to one another by the network NW in the above-mentioned embodiment, the present invention is not limited to this. For example, when the first data processing device 30, the second data processing device 40 and the analysis condition data conversion device 50 are configured by the same computer, this computer does not have to be connected to the network. Further, when all or part of the first data processing device 30, the second data processing device 40 and the analysis condition data conversion device 50 is configured by separate computers, analysis condition data may be transferred via a storage medium such as a USB (Universal Serial Bus) memory.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An analysis condition data conversion device comprising:
   an analysis condition data acquirer that acquires first analysis condition data indicating an analysis condition that is set in a first data processing device for a first analysis device;
   an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices; and
   a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

2. The analysis condition data conversion device according to claim 1, wherein
   the item setter sets a third item in which a default value is to be set as a value of a second analysis parameter in the second data processing device.

3. The analysis condition data conversion device according to claim 1, wherein
   the parameter value converter converts a value of the first analysis parameter of the first item into a value of the second analysis parameter based on a predetermined conversion rule.

4. The analysis condition data conversion device according to claim 3, wherein
   the conversion rule is multiplication of a value of the first analysis parameter of the first item by a predetermined conversion coefficient.

5. The analysis condition data conversion device according to claim 1, further comprising a display that displays a conversion screen having a data paste region, wherein
   the analysis condition data acquirer acquires data that is pasted in the data paste region as the first analysis condition data.

6. The analysis condition data conversion device according to claim 5, wherein
   the display displays a setting screen for the first analysis condition data of the first data processing device, and
   the analysis condition data acquirer acquires data that is copied from the setting screen and pasted in the data paste region of the conversion screen as the first analysis condition data.

7. The analysis condition data conversion device according to claim 1, further comprising a data format converter that converts a value of the second analysis parameter acquired by the parameter value converter into second analysis condition data having a format that is settable in the second data processing device.

8. The analysis condition data conversion device according to claim 7, wherein
   the data format converter converts the second analysis condition data into an analysis condition file having a format that is importable by the second data processing device.

9. The analysis condition data conversion device according to claim 1, wherein
   the first analysis device is a first mass spectrometry device, the second analysis device is a second mass spectrometry device, and a first analysis parameter of the first item is a parameter relating to production of ions.

10. The analysis condition data conversion device according to claim 9, wherein
    each of the first and second mass spectrometry devices includes a tandem mass spectrometer, a liquid chromatograph mass spectrometer or a gas chromatograph mass spectrometer, and
    the first analysis parameter of the first item is collision energy in the tandem mass spectrometer, an interface voltage in the liquid chromatograph mass spectrometer or an emission current in the gas chromatograph mass spectrometer.

11. A data processing system comprising:

an analysis condition data acquirer that acquires first analysis condition data indicating an analysis condition that is set in a first data processing device for a first analysis device;

an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices;

a second data processing device for the second analysis device; and a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

12. An analysis system comprising:

an analysis condition data acquirer that acquires first analysis condition data indicating an analysis condition that is set in a first data processing device for a first analysis device;

a second analysis device;

a second data processing device for the second analysis device;

an item setter that sets a plurality of first analysis parameters included in the first analysis condition data acquired by the analysis condition data acquirer in a first item that is dependent on characteristics of the first analysis device and a second analysis device, and a second item that is not dependent on the characteristics of the first and second analysis devices; and a parameter value converter that converts a value of a first analysis parameter of the first item that is set by the item setter into a value of a second analysis parameter corresponding to a second data processing device for the second analysis device, and takes a value of a first analysis parameter of the second item that is set by the item setter as a value of a second analysis parameter.

* * * * *